(12) United States Patent
Chang et al.

(10) Patent No.: US 10,140,799 B2
(45) Date of Patent: Nov. 27, 2018

(54) DEVICE FOR DETECTING FOREIGN OBJECT ATTACHED ON SURFACE OF SHEET-LIKE MEDIUM

(71) Applicant: GRG Banking Equipment Co., Ltd., Guangzhou, Guangdong (CN)

(72) Inventors: Yang Chang, Guangdong (CN); Hongjun Wu, Guangdong (CN); Zhuang Jiang, Guangdong (CN); Zhiqiang Sun, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/572,466

(22) PCT Filed: May 6, 2016

(86) PCT No.: PCT/CN2016/081259
§ 371 (c)(1),
(2) Date: Nov. 7, 2017

(87) PCT Pub. No.: WO2016/180277
PCT Pub. Date: Nov. 17, 2016

(65) Prior Publication Data
US 2018/0137709 A1    May 17, 2018

(30) Foreign Application Priority Data

May 13, 2015   (CN) .......................... 2015 1 0242884

(51) Int. Cl.
*G07F 7/04* (2006.01)
*G07D 7/02* (2016.01)
(Continued)

(52) U.S. Cl.
CPC ............... *G07D 7/02* (2013.01); *G07D 7/026* (2013.01); *G07D 7/164* (2013.01); *G07D 7/187* (2013.01);
(Continued)

(58) Field of Classification Search
CPC .......... G07D 7/02; G07D 7/023; G07D 7/026; G07D 7/20; G07D 7/164; G01B 7/087;
(Continued)

(56) References Cited

U.S. PATENT DOCUMENTS

| 4,255,652 A | 3/1981 | Weber |
| 4,355,300 A | 10/1982 | Weber |

(Continued)

FOREIGN PATENT DOCUMENTS

| CN | 101013515 A | 8/2007 |
| CN | 101013516 A | 8/2007 |

(Continued)

OTHER PUBLICATIONS

International Search Report and Written Opinion for Application No. PCT/CN2016/081259 dated Aug. 17, 2016.

(Continued)

*Primary Examiner* — Jeffrey A Shapiro
(74) *Attorney, Agent, or Firm* — Wolf, Greenfield & Sacks, P.C.

(57) ABSTRACT

A device for detecting a foreign object attached on a surface of a sheet-like medium, comprising a static electricity providing part (A) for providing static electrical charges, a medium transporting part (B) for transporting a medium under detection, and a static electricity sensor and identifier part (C). The medium transporting part comprises a static electricity receiving unit and a static electricity absorbing unit sequentially connected. The static electricity receiving unit is connected to the static electricity providing part (A), (Continued)

travelling direction and the static electricity absorbing unit is connected to the static electricity sensor and identifier part (C). The static electricity receiving unit is configured to transfer the static electrical charges obtained from the static electricity providing part (A) to the medium under detection. The static electricity absorbing unit is configured to absorb the static electrical charges of the medium under detection.

8 Claims, 3 Drawing Sheets

(51) Int. Cl.
```
G07D 7/189      (2016.01)
G07D 7/026      (2016.01)
G07D 7/164      (2016.01)
G07D 7/20       (2016.01)
G07D 7/187      (2016.01)
G01B 7/06       (2006.01)
```
(52) U.S. Cl.
CPC .............. *G07D 7/189* (2017.05); *G07D 7/20* (2013.01); *B65H 2511/13* (2013.01); *B65H 2511/16* (2013.01); *B65H 2511/162* (2013.01); *B65H 2553/80* (2013.01); *G01B 7/06* (2013.01); *G01B 7/08* (2013.01); *G01B 7/085* (2013.01); *G01B 7/087* (2013.01)

(58) Field of Classification Search
CPC . G01B 7/08; G01B 7/06; G01B 7/085; B65H 7/00; B65H 2511/13; B65H 2553/00; B65H 5/00; B65H 7/02; B65H 2301/5321; B65H 2407/30; B65H 2511/16; B65H 2511/50; B65H 2513/512; B65H 2553/80; B65H 2701/1912
USPC .................. 194/206, 207; 209/534; 235/379; 271/265.04, 263, 662, 193, 208, 262, 271/271–275, 282; 324/663, 671–675, 324/682; 340/674, 675; 361/212, 214, 361/220–222
See application file for complete search history.

(56) References Cited

U.S. PATENT DOCUMENTS

| | | | |
|---|---|---|---|
| 5,034,616 A | 7/1991 | Bercovitz | |
| 6,533,097 B1* | 3/2003 | Sakamoto | H05F 3/02 194/206 |
| 6,796,434 B2* | 9/2004 | Kako | B65H 7/02 209/534 |
| 6,955,253 B1 | 10/2005 | Mazur et al. | |
| 8,028,990 B2* | 10/2011 | Miyamoto | B65H 7/02 271/265.04 |
| 9,415,965 B2* | 8/2016 | Hiratsuka | B65H 29/125 |
| 9,506,737 B2* | 11/2016 | Jang | G01B 7/087 |
| 2010/0117295 A1* | 5/2010 | Miyamoto | B65H 7/02 271/265.04 |
| 2011/0052082 A1 | 3/2011 | Parkov et al. | |
| 2011/0309572 A1 | 12/2011 | Miyamoto | |
| 2012/0140791 A1 | 6/2012 | Lawandy | |
| 2014/0369590 A1 | 12/2014 | He et al. | |
| 2015/0042353 A1 | 2/2015 | Jang et al. | |

FOREIGN PATENT DOCUMENTS

| | | |
|---|---|---|
| CN | 101501734 A | 8/2009 |
| CN | 101788280 A | 7/2010 |
| CN | 102741888 A | 10/2012 |
| CN | 102859557 A | 1/2013 |
| CN | 103593907 A | 2/2014 |
| CN | 103617671 A | 3/2014 |
| CN | 103879806 A | 6/2014 |
| CN | 103996237 A | 8/2014 |
| CN | 203882369 U | 10/2014 |
| CN | 104361674 A | 2/2015 |
| CN | 104802514 A | 7/2015 |
| EP | 0 395 833 B1 | 5/1995 |
| EP | 3 082 113 A1 | 10/2016 |
| JP | H10-116369 A | 5/1998 |
| JP | H10-0283522 A | 10/1998 |
| WO | WO 2016/180277 A1 | 11/2016 |

OTHER PUBLICATIONS

Extended European Search Report dated Jun. 4, 2018 in connection with European Application No. EP 16792127.9.

* cited by examiner

DEVICE FOR DETECTING FOREIGN OBJECT ATTACHED ON SURFACE OF SHEET-LIKE MEDIUM

This application is the national phase of PCT Application No. PCT/CN2016/081259, filed May 6, 2016, which claims priority to Chinese patent application No. 201510242884.6 titled "DEVICE FOR DETECTING SHEET-TYPE MEDIUM WITH FOREIGN SUBSTANCE ATTACHED ON SURFACE", filed with the Chinese State Intellectual Property Office on May 13, 2015, the entire disclosures of both applications are incorporated herein by reference.

FIELD

The present application relates to the field of identification, and particularly to a device for detecting a sheet-type medium with a foreign substance attached on a surface.

BACKGROUND

In the field of conventional financial service equipments, a banknote having a foreign substance on a surface is detected generally by a thickness identification method, in which a mechanical device is contacted with the banknote. The identification method is implemented by a driving component and a driven component rotating with respect to each other. Specifically, the driving component is a driving shaft for detecting the thickness, and the driven component contacts a surface of a banknote so as to identify a thickness trace of the banknote. When contacting a foreign substance attached on the surface of the banknote, the driven component may have an abrupt height variation partially, and the thickness trace of the banknote may be slightly higher partially, identifying the banknote having a foreign substance attached on the surface.

However, due to the high requirement on manufacturing precision, and the extremely stringent requirement on machining precision of full jumping of the thickness driving shaft and the driven shaft, a mechanical contact-type thickness identification device has a high manufacturing cost. Further, a gap may exist between multiple driven components due to their large manufacturing volumes, causing a missing detection of the banknote partially, and reducing the identification rate for the banknote having a foreign substance attached.

SUMMARY

A device for detecting a sheet-type medium having a foreign substance attached on a surface is provided according to an embodiment of the present application, which may identify the medium to be detected having a foreign substance attached on a surface.

The technical solution according to an embodiment of the present application includes:

a device for detecting a sheet-type medium having a foreign substance attached on a surface includes a static electricity providing part for providing static electricity charges; a medium transporting part for transporting a medium to be detected; and a static electricity sensing and identifying part. The medium transporting part includes a static electricity receiving unit and a static electricity absorbing unit connected sequentially. The static electricity receiving unit is connected to the static electricity providing part, and the static electricity absorbing unit is connected to the static electricity sensing and identifying part. The static electricity receiving unit is configured to transfer static electricity charges obtained from the static electricity providing part to a medium to be detected. The static electricity absorbing unit is configured to absorb the static electricity charges of the medium to be detected, and the static electricity sensing and identifying part is configured to determine whether the medium to be detected has a foreign substance attached on a surface according to the received static electricity pattern of the medium to be detected.

Preferably, the static electricity receiving unit includes a first static electricity providing shaft, a second static electricity providing shaft, a third static electricity providing shaft and a fourth static electricity providing shaft. The third static electricity providing shaft is tangential to the fourth static electricity providing shaft and the first static electricity providing shaft respectively, the fourth static electricity providing shaft is tangential to the second static electricity providing shaft. The fourth static electricity providing shaft and the second static electricity providing shaft, and the third static electricity providing shaft and the first static electricity providing shaft are symmetric vertically with respect to a first tangential line in which the third static electricity providing shaft and the fourth static electricity providing shaft are tangential to each other.

Preferably, the static electricity absorbing unit includes a first static electricity absorbing shaft and a second static electricity absorbing shaft. A second tangential line in which the first static electricity absorbing shaft and the second static electricity absorbing shaft are tangential to each other is in the same horizontal plane with the first tangential line, and the first static electricity absorbing shaft and the second static electricity absorbing shaft are symmetric vertically with respect to the second tangential line.

Preferably, the first static electricity absorbing shaft and the third static electricity providing shaft are in transmission connection by a belt.

Preferably, the first static electricity absorbing shaft and the second static electricity absorbing shaft are provided with a first static electricity eliminating device and a second static electricity eliminating device respectively.

Preferably, each of the first static electricity providing shaft, the second static electricity providing shaft, the third static electricity providing shaft and the fourth static electricity providing shaft includes a metal shaft core, a static electricity skin, and an elastic padding material between the static electricity skin and the metal shaft core.

Preferably, each of the first static electricity absorbing shaft and the second static electricity absorbing shaft includes a metal shaft core, a static electricity absorbing skin, and an elastic material between the static electricity absorbing skin and the metal shaft core.

Preferably, the static electricity absorbing unit is connected to the static electricity sensing and identifying part by optical cables.

The embodiment of the present application has the following beneficial effects.

The device for detecting a sheet-type medium with a foreign substance attached on a surface includes the static electricity providing part, the medium transporting part, and the static electricity sensing and identifying part. The static electricity providing part provides static electricity charges to the static electricity receiving unit of the medium transporting part, and the static electricity receiving unit transfers the static electricity charges to the medium to be detected. In the process that the medium to be detected is conveyed in the medium transporting part, the static electricity absorbing unit of the medium transporting part absorbs the static electricity charges of the medium to be detected to generate a static electricity virtual image. The static electricity sensing and identifying part receives the static electricity virtual image of the medium to be detected and identifies whether the medium to be detected has a foreign substance attached on a surface. With this technical solution which does not pertain to the mechanical contact-type thickness identification method, the medium to be detected with a foreign substance attached on a surface can be identified rapidly.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

DETAILED DESCRIPTION

A device for detecting a sheet-type medium with a foreign substance attached on a surface according to an embodiment of the present application is provided, since mediums to be detected by the detection device are generally of sheet-type, this embodiment is described taken a banknote as a medium to be detected, however, the mediums to be detected are not limited to the banknote, and may also be other sheet-type mediums.

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 1:
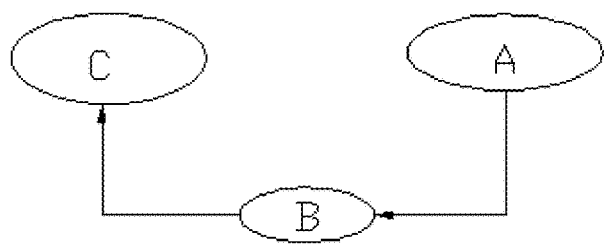
FIG. 1 is a schematic view of a device for detecting a sheet-type medium with a foreign substance attached on a surface according to an embodiment of the present application.
Figure 2:
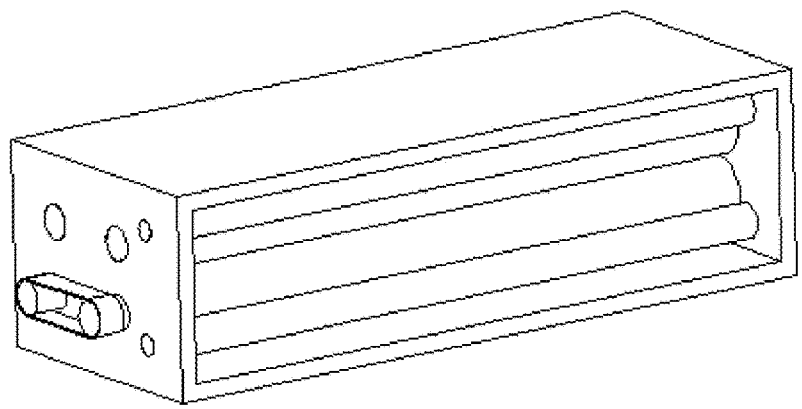
FIG. 2 is a perspective view of a device for detecting a sheet-type medium with a foreign substance attached on a surface according to an embodiment of the present application.
Figure 3:
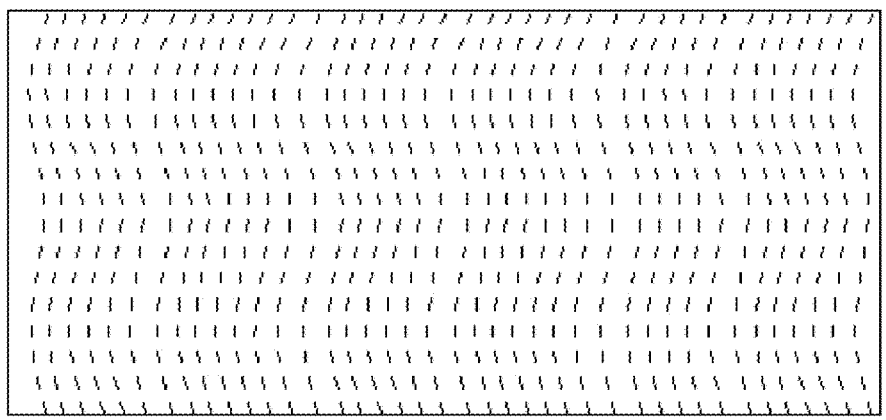
FIG. 3 is a schematic view of a static electricity virtual image of a normal banknote.

As shown in FIG. 1, a device for detecting a sheet-type medium with a foreign substance attached on a surface is provided according to the present application. The device includes: a static electricity providing part A, a banknote transporting part B (the banknote transporting part means that the mediums conveyed by the medium transporting part are banknotes, and the mediums conveyed by the medium transporting part may also be of other types), a static electricity sensing and identifying part C, wherein the banknote transporting part B includes a static electricity receiving unit connected to the static electricity providing part A, and a static electricity absorbing unit connected to the static electricity sensing and identifying part C;

wherein the static electricity providing part A is configured to provide static electricity charges required by the static electricity receiving unit of the banknote transporting part B by being connected to an external power supply;

wherein the banknote transporting part B is configured to convey banknotes, in the process that a banknote is conveyed in the banknote transporting part B, the static electricity receiving unit transfers static electricity charges obtained from the static electricity providing part A to the banknote, and then the banknote is conveyed to the static electricity absorbing unit, and the static electricity absorbing unit absorbs the static electricity charges on a surface of the banknote to generate a static electricity virtual image. Reference may be made to FIG. 2 for the specific formation in detail;

wherein the static electricity sensing and identifying part C has static electricity virtual images (as shown in FIG. 3) of normal banknotes stored inside, and whether the banknote has a foreign substance attached on a surface is determined by whether difference exists when comparing a static electricity virtual image of the banknote freshly acquired with a normal image in the image library.

With the above technical solution, the device for detecting a sheet-type medium with a foreign substance attached on a surface includes the static electricity providing part, the medium transporting part, and the static electricity sensing and identifying part. The static electricity providing part provides static electricity charges to the static electricity receiving unit of the medium transporting part, and the static electricity receiving unit transfers the static electricity charges to the medium to be detected. In the process that the medium to be detected is conveyed in the medium transporting part, the static electricity absorbing unit of the medium transporting part absorbs the static electricity charges of the medium to be detected to generate a static electricity virtual image. The static electricity sensing and identifying part receives the static electricity virtual image of the medium to be detected and identifies whether the medium to be detected has a foreign substance attached on a surface. With this technical solution which does not pertain to the mechanical contact-type thickness identification method, the medium to be detected with a foreign substance attached on a surface can be identified rapidly.

Figure 4:
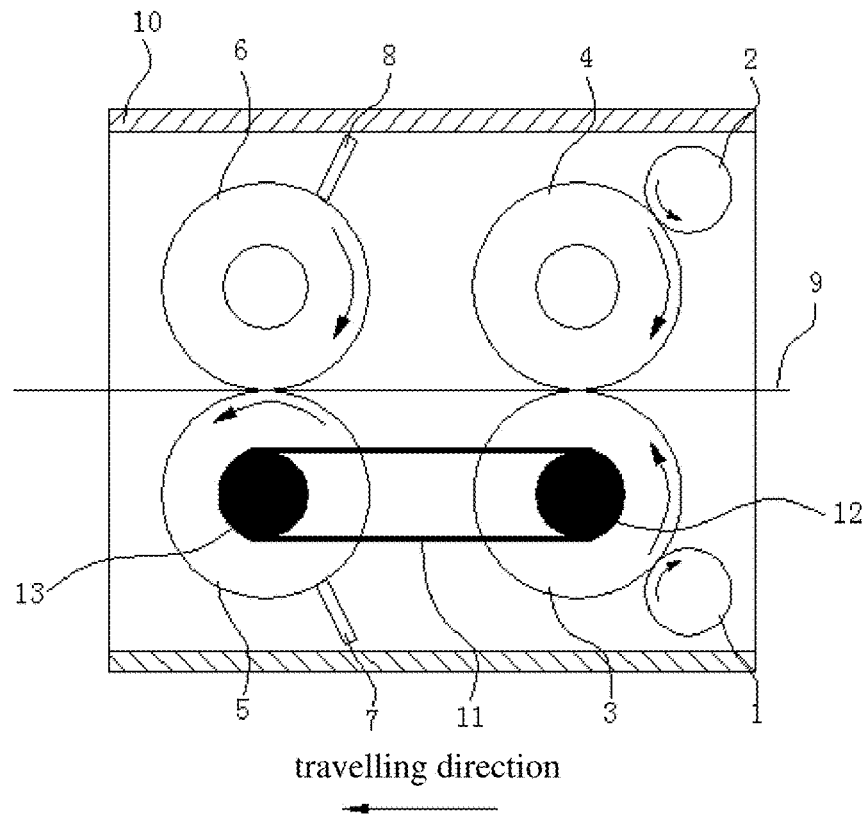
FIG. 4 is a schematic view showing the composition of a medium transporting part of a sheet-type medium with a foreign substance attached on a surface according to an embodiment of the present application.

Preferably, as shown in FIG. 4, the static electricity receiving unit includes a first static electricity providing shaft 1, a second static electricity providing shaft 2, a third static electricity providing shaft 3 and a fourth static electricity providing shaft 4. The third static electricity providing shaft 3 is a driving wheel, and is tangential to respectively the first static electricity providing shaft 1 and the fourth static electricity providing shaft 4. The fourth static electricity providing shaft 4 is tangential to the second static electricity providing shaft 2. The third static electricity providing shaft 3 may drive, by rotating, the first static electricity providing shaft 1 and the fourth static electricity providing shaft 4 to rotate. The fourth static electricity providing shaft 4 and the second static electricity providing shaft 2, and the third static electricity providing shaft 3 and the first static electricity providing shaft 1 are symmetric vertically with respect to a first tangential line in which the third static electricity providing shaft 3 and the fourth static electricity providing shaft 4 are tangential to each other. The medium to be detected (may be a banknote) is conveyed along a plane where the first tangential line is located, in this way, two surfaces, i.e., an upper surface and a lower surface of the medium to be detected (may be a banknote) may each obtain static electricity charges, which may identify whether each of the upper surface and the lower surface of the medium to be detected (may be a banknote) has a foreign substance attached hereon.

Preferably, as shown in FIG. 4, the static electricity absorbing unit includes a first static electricity absorbing shaft 5 and a second static electricity absorbing shaft 6. A second tangential line in which the first static electricity absorbing shaft 5 and the second static electricity absorbing shaft 6 are tangential to each other is in the same horizontal plane as the first tangential line. The first static electricity absorbing shaft 5 and the second static electricity absorbing shaft 6 are symmetric vertically with respect to the second tangential line. The medium to be detected (may be a banknote) is conveyed along the plane where the second tangential line is located. In this way, each of the upper surface and the lower surface of the medium to be detected (may be a banknote) may acquire static electricity charges, thereby may identify whether each of the upper surface and the lower surface of the medium to be detected (may be a banknote) has a foreign substance attached thereon.

Preferably, as shown in FIG. 4, the first static electricity absorbing shaft 5 and the third static electricity providing shaft 3 are in transmission connection by a belt 11.

Preferably, as shown in FIG. 4, the first static electricity absorbing shaft 5 and the second static electricity absorbing shaft 6 are provided with a first static electricity eliminating device 7 and a second static electricity eliminating device 8 respectively. By rotating, the static electricity eliminating device 7 and the static electricity eliminating device 8 eliminate the static electricity on surfaces of the static electricity absorbing shaft 5 and the static electricity absorbing shaft 6, to prepare the acquisition of static electricity virtual images of a next banknote.

As shown in FIG. 2, the position of each of the first static electricity providing shaft 1, the second static electricity providing shaft 2, the third static electricity providing shaft 3, the fourth static electricity providing shaft 4, the first static electricity absorbing shaft 5 and the second static electricity absorbing shaft 6 is limited by holes in a device frame 10 at two ends.

It is to be noted that, as shown in FIG. 4, the fourth static electricity providing shaft 4 is tangential to the second static electricity providing shaft 2. The fourth static electricity providing shaft 4 can drive, by rotating, the second static electricity providing shaft 2 to rotate. The third static electricity providing shaft 3 is connected to the first static electricity absorbing shaft 5 by the belt 11, and can drive, by rotating, the first static electricity absorbing shaft 5 to rotate. The first static electricity absorbing shaft 5 is tangential to the second static electricity absorbing shaft 6, and can drive, by rotating, the second static electricity absorbing shaft 6 to rotate. The first static electricity eliminating device 7 and the second static electricity eliminating device 8 are respectively fixed to an upper side and a lower side of the device frame 10 at an inner side, and are respectively in contact with the first static electricity absorbing shaft 5 and the second static electricity absorbing shaft 6. When the first static electricity absorbing shaft 5 and the second static electricity absorbing shaft 6 rotate, the first static electricity eliminating device 7 and the second static electricity eliminating device 8 respectively eliminate the static electricity at linear positions where the first static electricity eliminating device 7 and the second static electricity eliminating device 8 are in contact with the first static electricity absorbing shaft 5 and the second static electricity absorbing shaft 6 respectively.

It is to be noted that, the static electricity providing part A is connected to respectively the first static electricity providing shaft 1 and the second static electricity providing shaft 2 in the banknote transporting part B by cables, and provides equivalent quantity of charges to them, to allow them to be equipotential bodies. The first static electricity absorbing shaft 5 and the second static electricity absorbing shaft 6 in the banknote transporting part B are connected to the static electricity sensing and identifying part C by optical cables, and feed back the distribution situations of the static electricity virtual images to the static electricity sensing and identifying part C via the optical cables.

Figure 5:
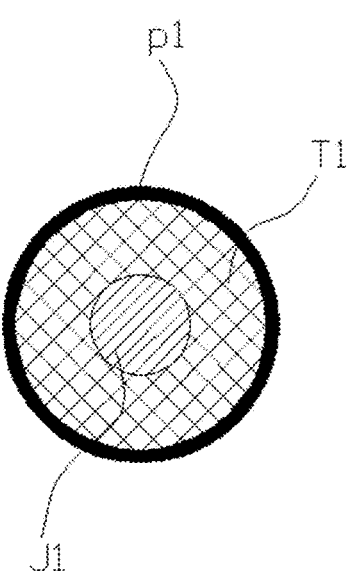
FIG. 5 is a schematic view showing the structures of a third static electricity providing shaft and a fourth static electricity providing shaft of a device for detecting a sheet-type medium with a foreign substance attached on a surface according to an embodiment of the present application.

Preferably, as shown in FIG. 5, the third static electricity providing shaft 3 and the fourth static electricity providing shaft 4 have the same structure, and each include a metal shaft core J1, a static electricity skin P1, and an elastic padding material T1. The static electricity providing part A may deliver charges to the static electricity skin P1 of the first static electricity providing shaft 1 and the static electricity skin P1 of the second static electricity providing shaft 2, to allow the charges to be distributed on surfaces of the static electricity skins P1 evenly. By rotating in a manner of fitting against the third static electricity providing shaft 3 and the fourth static electricity providing shaft 4 respectively, the first static electricity providing shaft 1 and the second static electricity providing shaft 2 deliver charges respectively to the third static electricity providing shaft 3 and the fourth static electricity providing shaft 4. In this case, a surface, i.e., the static electricity skin P1 of the third static electricity providing shaft 3 and a surface, i.e., the static electricity skin P1 of the fourth static electricity providing shaft 4 are equipotential bodies. Then the static electricity charges are provided to the two surfaces of the banknote 9 by the static electricity skin P1 of the third static electricity providing shaft 3 and the static electricity skin P1 of the fourth static electricity providing shaft 4, which allows static electricity virtual images to be formed on surfaces at two sides of the banknote 9 according to their textures. Meanwhile, the lost charges of the static electricity skins P1 since the static electricity skins P1 supply static electricity charges to the banknote 9 will also be supplemented timely by the static electricity providing part A. It is to be noted that, the static electricity skin P1 of the first static electricity providing shaft 1, the static electricity skin P1 of the second static electricity providing shaft 2, the static electricity skin P1 of the third static electricity providing shaft 3 and the static electricity skin P1 of the fourth static electricity providing shaft 4 are each of the same structure, here distinguishing is not made between the static electricity skin P1 of the first static electricity providing shaft 1, the static electricity skin P1 of the second static electricity providing shaft 2, the static electricity skin P1 of the third static electricity providing shaft 3 and the static electricity skin P1 of the fourth static electricity providing shaft 4, all of which are denoted by the static electricity skin.

Figure 6:
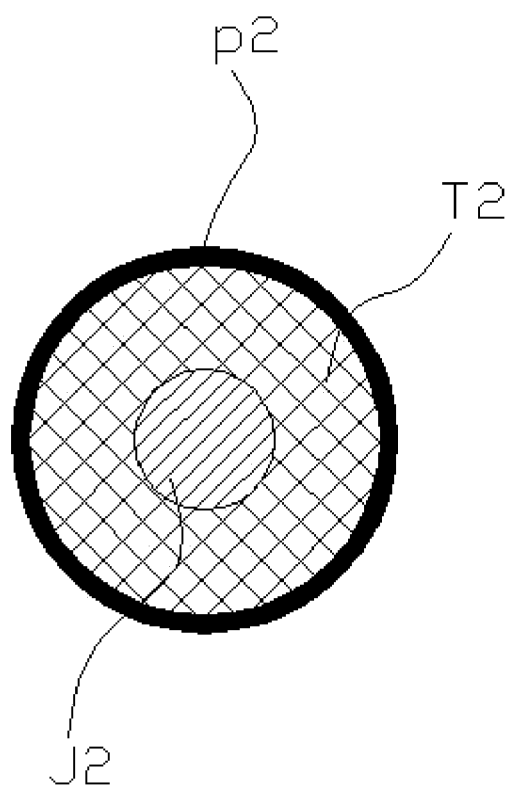
FIG. 6 is a schematic view showing the structures of a first static electricity absorbing shaft and a second static electricity absorbing shaft of a device for detecting a sheet-type medium with a foreign substance attached on a surface according to an embodiment of the present application.

Preferably, as shown in FIG. 6, the first static electricity absorbing shaft 5 and the second static electricity absorbing shaft 6 have the same structure, and each include a metal shaft core J2, a static electricity absorbing skin P2, and an elastic material T2. The static electricity absorbing skins P2 may absorb the static electricity charges on the upper surface and the lower surface of the banknote 9, and form static electricity virtual images on their surfaces. It is to be noted that, in this embodiment, the metal shaft core J1 and the metal shaft core J2 are each of the same structure, and are each denoted by the metal shaft core, and may also be defined as the first metal shaft core J1 and the second metal shaft core J2 for distinguishing.

Preferably, the first static electricity absorbing shaft 5 and the second static electricity absorbing shaft 6 in the banknote transporting part B are connected to the static electricity sensing and identifying part C by optical cables, and feed back the distribution situations of the static electricity virtual images to the static electricity sensing and identifying part C via the optical cables.

The static electricity sensing and identifying part C identifies features such as the shape and position of the static electricity virtual images absorbed on surfaces of the static electricity absorbing skins P2 by sensors, thereby identifying the static electricity virtual patterns on surfaces of the banknote medium 9.

Compared with the conventional technology, this solution does not pertain to the mechanical contact-type thickness identification method, and does not have the issues such as extremely high requirement on mechanical manufacturing precision, high manufacturing cost, high manufacturing failure rate, and high detection missing rate in the identification.

Figure 7:
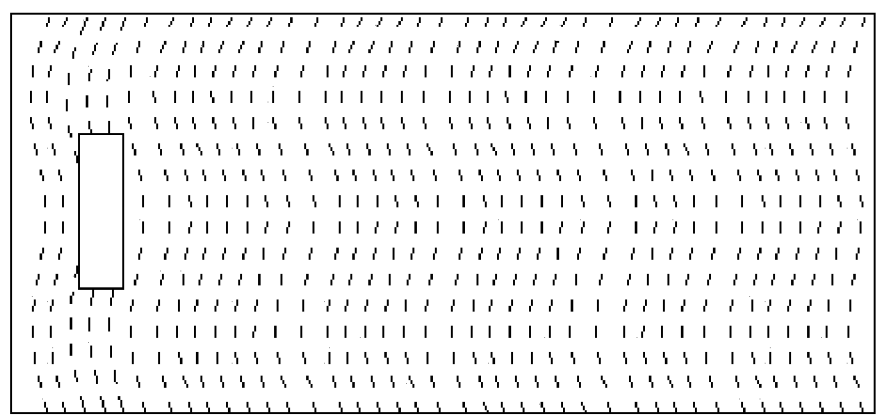
FIG. 7 is a schematic view of a static electricity virtual image of a banknote with a foreign substance attached on a surface.

The working principle of the embodiment of the present application is as follow:

when there is an external customer requirement instruction, the static electricity providing part A delivers equivalent quantity of charges to the static electricity skin P1 in the first static electricity providing shaft 1 and the static electricity skin P1 in the second static electricity providing shaft 2 in the banknote transporting part B by the cables, which allows the static electricity charges to be distributed evenly on surfaces of the static electricity skins P1;

by an external power, the third static power providing shaft 3 begins to rotate, and drives the first static electricity providing shaft 1, the second static electricity providing shaft 2, the fourth static electricity providing shaft 4, the first static electricity absorbing shaft 5 and the second static electricity absorbing shaft 6 to rotate together by the power transmission belt 11 and the friction generated by tangential contact between their surfaces; by rotating in the state of fitting against the third static electricity providing shaft 3 and the fourth static electricity providing shaft 4, the first static electricity providing shaft 1 and the second static electricity providing shaft 2 deliver charges to the third static electricity providing shaft 3 and the fourth static electricity providing shaft 4, to allow the static electricity skin P1 of the third static electricity providing shaft 3 and the static electricity skin P1 of the fourth static electricity providing shaft 4 to be fully charged with static electricity;

by being conveyed, the banknote medium 9 enters the banknote transporting part B, firstly the banknote 9 enters a clamping portion between the third static electricity providing shaft 3 and the fourth static electricity providing shaft 4; the texture patterns on surfaces of the banknote 9 are in sufficient contact with the static electricity skin P1 of a surface of the third static electricity providing shaft 3 and the static electricity skin P1 of a surface of the fourth static electricity providing shaft 4; the third static electricity providing shaft 3 and the fourth static electricity providing shaft 4 deliver charges to the texture patterns on the front side and the back side of the banknote 9 in contact with the third static electricity providing shaft 3 and the fourth static electricity providing shaft 4, which forms static electricity virtual images taking the texture patterns on surfaces of the banknote as substrates; the static electricity virtual image of a surface of the normal banknote medium 9 may refer to FIG. 3; when a banknote 9 with a foreign substance attached on a surface passes, the static electricity pattern generated on its surface may vary due to different attachment, thus another different pattern may be generated, as shown in FIG. 7.

The banknote 9 keeps moving on, enters a clamping portion between the first static electricity absorbing shaft 5 and the second static electricity absorbing shaft 6. The static electricity charges on the front side and the back side of the banknote medium 9 are absorbed on the static electricity absorbing skin P2 on a surface of the first static electricity absorbing shaft 5 and the static electricity absorbing skin P2 on a surface of the second static electricity absorbing shaft 6. The first static electricity absorbing shaft 5 and the second static electricity absorbing shaft 6 transmit signals of the static electricity virtual images on surfaces to the static electricity sensor processor part C by the optical cables. The static electricity sensor and processor part C determines features such as the shape and position of the static electricity virtual images on a surfaces of the static electricity absorbing skins P2 by sensors, to identify whether a foreign substance is attached on a surface of the banknote by comparing the determined features with the normal static electricity virtual images stored inside the static electricity sensing and identifying part C. When the comparison result shows that the static electricity patter (FIG. 7) on a surface of the banknote 9 is different from the normal static electricity image (FIG. 3) stored inside the static electricity sensing and identifying part C, it may determine that the banknote has a foreign substance attached on a surface.

The invention claimed is:

1. A device for detecting a sheet-type medium with a foreign substance attached on a surface, comprising:
    a static electricity providing part for providing static electricity charges;
    a medium transporting part for conveying a medium to be detected; and
    a static electricity sensing and identifying part,
    wherein the medium transporting part comprises a static electricity receiving unit and a static electricity absorbing unit connected in a listed sequence, the static receiving unit is connected to the static electricity providing part, the static electricity absorbing unit is connected to the static electricity sensing and identifying part, the static electricity receiving unit is configured to transfer static electricity charges obtained from the static electricity providing part to a medium to be detected, the static electricity absorbing unit is configured to absorb the static electricity charges of the medium to be detected, and the static electricity sensing and identifying part is configured to determine whether the medium to be detected has a foreign substance attached on a surface according to a received static electricity pattern of the medium to be detected,
    wherein the static electricity receiving unit comprises:
    a first static electricity providing shaft, a second static electricity providing shaft,
a third static electricity providing shaft, and
a fourth static electricity providing shaft,
wherein the third static electricity providing shaft is tangential to respectively the fourth static electricity providing shaft and the first static electricity providing shaft, the fourth static electricity providing shaft is tangential to the second static electricity providing shaft, the fourth static electricity providing shaft and the second static electricity providing shaft, and the third static electricity providing shaft and the first static electricity providing shaft are symmetric vertically with respect to a first tangential line in which the third static electricity providing shaft and the fourth static electricity providing shaft are tangential to each other.

2. The device for detecting a sheet-type medium with a foreign substance attached on a surface according to claim 1, wherein the static electricity absorbing unit comprises:
a first static electricity absorbing shaft, and
a second static electricity absorbing shaft,
wherein a second tangential line in which the first static electricity absorbing shaft and the second static electricity absorbing shaft are tangential to each other is in the same horizontal plane with the first tangential line, and the first static electricity absorbing shaft and the second static electricity absorbing shaft are symmetric vertically with respect to the second tangential line.

3. The device for detecting a sheet-type medium with a foreign substance attached on a surface according to claim 2, wherein the first static electricity absorbing shaft and the third static electricity providing shaft are in transmission connection by a belt.

4. The device for detecting a sheet-type medium with a foreign substance attached on a surface according to claim 2, wherein the first static electricity absorbing shaft and the second static electricity absorbing shaft are provided with a first static electricity eliminating device and a second static electricity eliminating device respectively.

5. The device for detecting a sheet-type medium with a foreign substance attached on a surface according to claim 1, wherein each of the first static electricity providing shaft, the second static electricity providing shaft, the third static electricity providing shaft and the fourth static electricity providing shaft comprises a metal shaft core, a static electricity skin, and an elastic padding material between the static electricity skin and the metal shaft core.

6. The device for detecting a sheet-type medium with a foreign substance attached on a surface according to claim 2, wherein each of the first static electricity absorbing shaft and the second static electricity absorbing shaft comprises a metal shaft core, a static electricity absorbing skin, and an elastic material between the static electricity absorbing skin and the metal shaft core.

7. The device for detecting a sheet-type medium with a foreign substance attached on a surface according to claim 6, wherein the static electricity absorbing unit is connected to the static electricity sensing and identifying part by optical cables.

8. The device for detecting a sheet-type medium with a foreign substance attached on a surface according to claim 3, wherein the first static electricity absorbing shaft and the second static electricity absorbing shaft are provided with a first static electricity eliminating device and a second static electricity eliminating device respectively.

* * * * *